United States Patent [19]

Akerberg et al.

[11] 4,391,946
[45] Jul. 5, 1983

[54] FURAN POLYMER CONCRETE

[75] Inventors: Denis W. Akerberg, Huntley; David D. Watson, Barrington, both of Ill.

[73] Assignee: The Quaker Oats Company, Chicago, Ill.

[21] Appl. No.: 322,489

[22] Filed: Nov. 18, 1981

[51] Int. Cl.³ .............................................. C08L 45/00
[52] U.S. Cl. .................................... 524/849; 524/876; 524/914
[58] Field of Search ................ 523/150; 524/849, 876, 524/914

[56] References Cited

U.S. PATENT DOCUMENTS

| | | | |
|---|---|---|---|
| 3,407,167 | 10/1968 | Slysh | 524/849 |
| 3,527,146 | 9/1970 | Garling | 523/150 |
| 3,551,365 | 12/1970 | Matalon | 524/876 |
| 3,738,955 | 6/1973 | Bozer et al. | 501/129 |

*Primary Examiner*—Lewis T. Jacobs
*Attorney, Agent, or Firm*—Gerald T. Shekleton; Karen E. Ayd

[57] ABSTRACT

A furan polymer concrete is described comprising aggregate, acid catalyst and binder which includes furfuryl alcohol and a crosslinking monomer. The binder has a low viscosity, thereby allowing significantly less binder to be used in forming the polymer concrete.

9 Claims, No Drawings

FURAN POLYMER CONCRETE

BACKGROUND OF THE INVENTION

This invention relates to a bound aggregate building material composition and in particular to a polymer concrete.

The current standard building material composition, concrete prepared by binding aggregate with Portland cement, has a number of deficiencies which make it inappropriate for some applications. For instance a suitable cure with Portland cement takes approximately 28 days. In addition, chemical resistance to acid is lacking in Portland cement, as is good tensile and flexural strength. Several attempts have been made to replace Portland cement with different building compositions to overcome the above described problems. Heretofore such substitute materials will sacrifice one property such as strength for another property such as acid resistance or the like. These substitute materials have taken the form of both coatings for Portland cement as well as complete replacement materials. Among the coating materials known are furfuryl alcohol based furan resin mortars, grouts and cements which have a long history of excellent performance in severely corrosive environments. In the past furfuryl alcohol based furan laminating resins have been used extensively to produce reinforced plastic equipment for the chemical process and related industries. Such furan reinforced plastic equipment has been used in environments where polyester, vinyl ester and epoxy resins will not provide acceptable corrosion resistance or fire properties.

SUMMARY OF THE INVENTION

Therefore an object of the subject invention is an improved building material composition with greater compressive flexural and tensile strengths.

Another object of the subject invention is an improved bound aggregate building material composition with a short cure time.

Still another object of the subject invention is a bound aggregate building material composition with high corrosion resistance.

The objects of the subject invention are attained by the composition of the subject invention, which is a furan polymer concrete comprising monomeric furfuryl alcohol crosslinked with an appropriate monomer having a ring structure, and including a catalyst system in conjunction with a size graded aggregate. The resulting polymer concrete has outstanding corrosion resistance, high tensile, compressive, and flexural strength, each of installation, and a rapid cure. All of the above attributes make the furan polymer concrete of the subject invention an excellent solution to corrosion problems previously requiring acid-proof brick construction or monolithic topping and coating. With such a furan polymer concrete traffic can be allowed on newly installed floors within a few hours. In addition a significantly lower binder level is required, since the furan polymer concrete of the subject invention generally requires only 7 to 13 percent binder based on the aggregate as compared to a 13 to 16 percent binder in the average polymer concrete. Such a reduced level of binder in the concrete is due primarily to the extremely low viscosity of the binder system for better distribution on and wetting of the aggregate by the binder.

DESCRIPTION OF A PREFERRED EMBODIMENT

The binder of the subject invention comprises a mixture of about 94 percent monomeric furfuryl alcohol with about 6 percent crosslinking monomer selected from the group of Bis-Phenol A, Resorcinol, Hydroxymethyl Furan, Bishydroxymethyl Furan and furfural. Each of the above crosslinking monomers comprise ring structures which are reactable with furfuryl alcohol to crosslink and become an integral part of the resin structure. 0.05 percent to about 0.3 percent of a silane may be added to the mixture when using the binder and aggregate mixture for a topping of a preexisting Portland cement substrate. Silanes suitable for use with this subject invention may include gamma aminopropyl triethyoxy silane as well as those silanes taught in U.S. Pat. Nos. 3,681,287, 3,738,955 and 3,888,816. As stated above it is the low viscosity of the resulting furfuryl alcohol binder solution which permits the use of less binder in the concrete. Increasing the viscosity of the binder system to over 15 cps., as by adding excessive amounts of a crosslinking agent, or even low amounts of a crosslinking agent with extraordinarily high viscosity, will cause the advantages of the low viscosity of the furfuryl alcohol to be lost. We have found that a viscosity of 15 cps. is the maximum that can be tolerated in aggregate mixtures associated with polymer concrete without increasing the binder content outside the range set forth above. Should the viscosity be increased too greatly, say above about 50 cps., the percentage of binder required for acceptable strength levels becomes equal to that of current binder levels and a major advantage of the subject invention is lost.

It is also known that increasing the percentage of crosslinking monomer beyond the optimum capacity of the resin to assimilate the crosslinking monomer will decrease the strength and other characteristics of the resultant binder system. Monomeric furfuryl alcohol generally will tolerate up to about 25 percent crosslinking monomer before deterioration of its physical properties reaches an unacceptable level. As a result it would appear that a crosslinking agent can be added to furfuryl alcohol to form the binder of the subject invention in levels which retain the viscosity of the binder below about 15 cps., or which do not exceed 25 percent of the total binder by weight.

As an example of the limits of the subject invention the addition of the solid Bis Phenol A to furfuryl alcohol increases the viscosity of the resulting binder solution according to the following table.

TABLE I

| Solution | Furfuryl Alcohol | Bis Phenol A | Viscosity (cps.) |
|---|---|---|---|
| 1 | 94 | 6 | 9 |
| 2 | 90 | 10 | 10 |
| 3 | 80 | 20 | 15 |
| 4 | 75 | 25 | 15 |

From this data the viscosity of the solution would appear to bring the binder mixture outside the scope of the subject invention at the same time that the upper level limit of the Bis Phenol A content is reached.

The binders of the subject invention may be catalyzed with most acidic catalysts. However, it should be noted that the acidic catalyst used with the binder of the subject invention should always be distributed evenly on the aggregate before the binder is added to the aggregate catalyst mixture. As with any furan resin it is advisable not to mix the acid catalyst directly with the binder as a violent exothermic reaction can occur. In general the acidic catalysts which may be employed include toluene sulfonic acid, sulfuric acid, sulfamic acid, phosphoric acid, ammonium chloride, ammonium trichloride acetate, ammonium phosphate, ammonium sulfate and ammonium nitrate. Latent catalysts such as ferric chloride and acid chloride such as phthaloyl chloride or tolyoyl chloride may also be used. The catalyst of choice for use with the subject invention is toluene sulfonic acid and its homologs, namely benzene sulfonic acid, phenol sulfonic acid, and xylene sulfonic acid. Most preferable is the mixture of such acids and their urea salts taught in U.S. Ser. No. 255,586 filed Apr. 20, 1981 by Applicant and assigned to the assignee of the subject invention. As taught in that application, control of the various ratios of a aromatic sulfonic acid and the urea salt of that sulfonic acid can extend the working life of the subsequent aggregate mixture from less than 10 minutes to over an hour with no significant loss in either the physical or other desired properties. Such a short curing time is a complete contrast to present Portland cement experiences, which often require several days of cure before heavy traffic is allowed. The cure of the furan polymer concrete of the subject invention is substantially complete within a few hours, considerably shortening the wait to allow traffic to go upon it.

The aggregate which may be used with the binder and catalyst of the subject invention include most alkali-free aggregate such as silica, carbon, quartz and some granites. Mica, certain types of fly ash and basalt may also be found suitable. Alkalinity in the aggregate can neutralize the acidic catalyst and severely inhibit or totally retard the cure. Therefore it is particularly important that alkalinity not be present in any part of the aggregate which may be used in the formulation. As known in the art, different porosities of the cured cement may be obtained through a mixture of different grades of aggregate. For instance, as little as 0.1–0.3 percent porosity may be obtained with a properly sized graded aggregate comprising 50 percent coarse particles (1/8" to 1/4"), 20 percent intermediate particles (20–50 mesh) and 30 percent fines (less than 140 mesh, with 75 percent less than 325 mesh). Other size gradations may yield less porosity, dependent on considerations such as viscosity and amount of binder, type of aggregate and other factors known to those in the art.

When toluene sulfonic acid is used as the sole catalytic agent for the binder, good cures at normal working temperatures can be attained with a level of 10 percent by weight based on the binder weight. However, use of toluene sulfonic acid results in a severely limited mix working time of approximately 5 to 10 minutes at 75° F. Should the temperature of the aggregate exceed 75° F. the toluene sulfonic acid catalyzed mix may also exotherm, blister, and be difficult to control. Such difficulties may also occur if the concrete is cast in sections thicker than two or three inches. The most influential factor under such conditions is the temperature of the aggregate, which functions as a massive heat sink with its dominating effect on the working time of the mix. Therefore the blistering caused by exothermic can be immediately controlled through the distribution of quantities of sand over the top of the concrete mix, i.e. through the addition of additional heat sink capabilities.

Should the temperature of the aggregate go below 65° F. most of the above listed catalysts may not prove suitable. Toluene sulfonic acid and its homologs may be found more preferable at such low temperatures.

Corrosion tests were conducted on 1"×2" thick furan polymer concrete test cylinders formed according to the subject invention, by totally immersing such test cylinders in different corrosive media for one year at 150° F. These tests indicate that the furan polymer concrete of the subject invention should be suitable for use in the environments that have been serviced for many years by furan mortars and glass reinforced furan equipment. Such media include various acids such as acetic acid, acrylic acid, phosphoric acid, and sulfuric acid and hydrochloric acid, solvents such as benzene, carbon disulfide, carbon tetrachloride, ethanol, ethyl acetate, methanol, methyl ethyl ketone, and the like. Other common corrosive chemicals which do not attack the furan polymer concrete of the subject invention include monochlorobenzene, acrylonitrile, perchloroethylene, trichloroethylene and zinc chloride.

Other chemicals which will attack the siliceous aggregates which may form a part of the furan polymer concrete of the subject invention, such as strong caustic or hydrofluoric acid, will therefore affect the integrity and strength of the furan polymer concrete. Therefore continuous exposure or total immersion in such media is not recommended for the furan polymer concrete of the subject invention. However, in flooring or other applications where such media are present in the low concentrations or in splash-spill wash down situations the furan polymer concrete of the subject invention may prove suitable.

The subject invention is further illustrated but not limited by the following Examples. Unless otherwise indicated herein the term parts refers to parts by weight.

EXAMPLE I

A series of tests were conducted to illustrate the use of different crosslinking agents with the furfuryl alcohol to provide the furan polymer resin of the subject invention. Under each of the tests the following procedure was followed: First, a quantity of aggregate was weighed and set aside. Next the monomeric binder composition was prepared by thoroughly admixing the stated ingredients in the amounts indicated. An amount of the monomeric binder equal to that indicated percent by weight of the aggregate was weighed and set aside. Next an amount of acidic catalyst based on a percentage of weight of a binder as indicated was weighed and thoroughly mixed into the aggregate. After the aggregate and acidic catalyst was thoroughly mixed the binder composition was added thereto and thoroughly mixed therein. Samples were prepared from each of these mixtures as set forth above and allowed to cure prior to taking measurements for tensile strength and compressive strength including strength in acidic and basic media.

TABLE II

| Binder | Composition of Furan Polymer Concrete | | | | | | Strength After 3 Months Immersion | | | | |
|---|---|---|---|---|---|---|---|---|---|---|---|
| | | | | | Parts | | | | | | |
| Crosslinker | Parts FA[5] | Parts Silane[4] | Parts Binder | White Quartz | Silica Flour | Catalyst TSA[6] | H2O at 150° F. | 15% HCl at 150° F. | 5% NaOH at 150° F. | CH2Cl2 at 75° F. | 1 Month at 75° F. |
| [1]BPA - 6 pts. | 94 | .15 | 9.5 | 62.7 | 26.8 | 1.0 | 11,112 psi | 11,852 psi | 5,130 psi | 2,436 psi | 10,206 |
| [2]FCHO - 10 pts | 90 | .15 | 9.5 | 62.7 | 26.8 | 1.0 | 8,478 | 7,366 | 3,416 | 1,646 | 8,971 |
| [3]HMF - 10 pts. | 90 | .15 | 9.5 | 62.7 | 26.8 | 1.0 | 5,309 | 5,514 | 2,963 | 1,214 | 9,918 |

[1]Bis Phenol A
[2]Furfural
[3]Hydroxymethyl Furan
[4]Gamma Amino Propyl Triethoxy Silane
[5]Furfuryl Alcohol
[6]Toluene Sulfonic Acid Uses other than polymer concrete present itself for the binder of the subject invention depending on the level of binder included in the mixture. For instance with about 12 percent binder level, a self leveling grout results. With an appropriate aggregate such as carbon flour with about 28 percent level of binder a mortar results. Such compositions retain the improved corrosion resistant properties of the subject invention as well as the compressive strength, when compared with the prior art.

EXAMPLE II

A series of tests were conducted to show the compatibility of various acid catalyst systems with the preferred binder of the subject invention as represented by a mixture of furfuryl alcohol and Bis-Phenol A. The procedure of Example I was followed in all respects.

While the invention has been described with reference to a preferred embodiment, it will be understood by those skilled in the art that various changes may be made and equivalents may be substituted by elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated by carrying out this invention, but that the invention will include all embodiments falling within the scope of the appended claims.

We claim:

1. A polymer concrete for use in a corrosive environment comprising a nonalkaline aggregate, a furan binder having a viscosity less than 15 cps at 25° C. and an acidic catalyst, wherein said furan binder comprises furfuryl alcohol, a silane and less than 25 percent by weight based on the weight of the furan binder of a cross-linking monomer selected from the group consisting of bis-phenol A, furfural, resorcinol, hydroxymethylfuran, and bis-hydroxymethylfuran.

2. The polymer concrete of claim 1 wherein said non-alkaline aggregate is size graded for decreased porosity.

3. The polymer concrete of claim 1 wherein said acidic catalyst is selected from the group of toluene sulfonic acid, benzene sulfonic acid, xylene sulfonic acid, phenol sulfonic acid and mixtures of said acids.

4. The polymer concrete of claim 1 wherein said acidic catalyst comprises a mixture of an aromatic sulfonic acid and the urea salt of said acid.

5. The polymer concrete of claim 1 wherein said furan binder comprises a mixture of about 94 percent furfuryl alcohol and about 6 percent bis-phenol A.

6. The polymer concrete of claim 1 wherein the concrete contains binder in the range of 7 to 13 percent inclusive based on the weight of the aggregate.

7. The process for forming a bound aggregate building material composition comprising the steps of:
   a. forming a binder system by admixing monomeric furfuryl alcohol with a cross-linking monomer having a ring structure therein and crosslinkable with furfuryl alcohol, said cross-linking monomer in an amount less than 25 percent of said binder system wherein said binder system has a viscosity of less than about 15 cps at 25° C.;

TABLE III

| Binder Composition | | Composition of Furan Polymer Concrete | | | | | | Compressive Strength[3] (psi) | Tensile (psi) | Flexural (psi) |
|---|---|---|---|---|---|---|---|---|---|---|
| Parts BPA[1] | Parts FA[2] | Parts Silane[4] | Parts Binder | Parts White Quartz | Parts Silica Flour | Parts Catalyst | Catalyst | | | |
| 6 | 94 | .15 | 9.5 | 62.7 | 26.8 | 1.0 | Toluene Sulfonic Acid | 11,070 | 1,725 | 4,354 |
| 6 | 94 | .15 | 9.5 | 62.7 | 26.8 | 1.0 | Phenol Sulfonic Acid/ Urea Phenol Sulfonate (1:1 ratio) | 10,803 | 2,000 | |
| 6 | 94 | .15 | 9.5 | 62.7 | 26.8 | 1.0 | Phenol Sulfonic Acid/ Urea Phenol Sulfonate (1:2 ratio) | 9,793 | | |
| 6 | 94 | .15 | 9.5 | 62.7 | 26.8 | 1.0 | Phenol Sulfonic Acid/ Urea Phenol Sulfonate (1:3 ratio) | 9,424 | 1,913 | 3,950 |
| 6 | 94 | .15 | 9.5 | 62.7 | 26.8 | 1.0 | H3PO4/H2SO4 (10:1 ratio) | 6,967 | | |
| 6 | 94 | .15 | 9.5 | 62.7 | 26.8 | 1.0 | Sulfamic Acid | 7,407 | | |
| 6 | 94 | .15 | 9.5 | 62.7 | 26.8 | 1.0 | 50% Urea Phenol Sulfonate | 8,560 | 2,100 | |

[1]Bis Phenol A
[2]Furfuryl Alcohol
[3]After 2 hours at 200° C. and 2 hours at 250° F.
[4]Gamma Amino Propyl Triethoxy Silane b. forming a catalyzed aggregate by admixing nonalkaline aggregate and acidic catalyst; and c. admixing said binder system and said catalyzed aggregate to form a bound aggregate building material composition.

8. The process of claim 7 wherein the cross-linking monomer is selected from the group consisting of bis-phenol A, furfural, resorcinol, hydroxymethylfuran, and bis-hydroxymethylfuran.

9. The process of claim 7 wherein the temperature of the aggregate is less than 65° F. and wherein the acidic catalyst is toluene sulfonic acid.

* * * * *